US009379656B2

(12) United States Patent  
Hsu et al.

(10) Patent No.: US 9,379,656 B2  
(45) Date of Patent: Jun. 28, 2016

(54) FORCE FEEDBACK MECHANISM AND RELATED ELECTRONIC DEVICE AND OPERATION METHOD

(71) Applicant: Wistron Corporation, New Taipei (TW)

(72) Inventors: Wen-Chieh Hsu, New Taipei (TW); Ming-Chih Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 14/109,963

(22) Filed: Dec. 18, 2013

(65) Prior Publication Data

US 2015/0022138 A1    Jan. 22, 2015

(30) Foreign Application Priority Data

Jul. 17, 2013  (TW) .............................. 102125609 A

(51) Int. Cl.
| | |
|---|---|
| *G01C 19/30* | (2006.01) |
| *G06F 3/0488* | (2013.01) |
| *H02P 23/00* | (2016.01) |
| *G06F 1/16* | (2006.01) |
| *G06F 3/01* | (2006.01) |

(52) U.S. Cl.
CPC .......... *H02P 23/0063* (2013.01); *G06F 1/1615* (2013.01); *G06F 1/1684* (2013.01); *G06F 3/016* (2013.01)

(58) Field of Classification Search
None
See application file for complete search history.

(56) References Cited

U.S. PATENT DOCUMENTS

| | | | | |
|---|---|---|---|---|
| 4,892,273 | A | | 1/1990 | Fedor |
| 5,905,317 | A | * | 5/1999 | Aoki ........................ 267/140.14 |
| 5,982,573 | A | * | 11/1999 | Henze ...................... G11B 5/54 360/60 |
| 6,279,704 | B1 | * | 8/2001 | Manfredotti ................. 188/378 |
| 6,472,840 | B1 | * | 10/2002 | Takahashi ..................... 318/649 |
| 8,308,664 | B2 | | 11/2012 | Pathak |
| 2007/0024228 | A1 | * | 2/2007 | Fujinaka ....................... 318/696 |
| 2009/0126610 | A1 | * | 5/2009 | Suzuki .......................... 112/155 |
| 2009/0138900 | A1 | * | 5/2009 | Wu .......................... G11B 33/08 720/651 |
| 2009/0140989 | A1 | * | 6/2009 | Ahlgren ................ G06F 3/0414 345/173 |

(Continued)

FOREIGN PATENT DOCUMENTS

| | | | | |
|---|---|---|---|---|
| JP | | 11139533 A | * | 5/1999 |
| JP | | 2004120963 A | * | 4/2004 |
| TW | | I320557 | | 2/2010 |

OTHER PUBLICATIONS

Office action mailed on Sep. 25, 2014 for the Taiwan application No. 102125609, filing date: Jul. 17, 2013, p. 1 line 13~14, p. 2 and p. 3 line 1~3.

*Primary Examiner* — Eduardo Colon Santana  
*Assistant Examiner* — Cortez Cook  
(74) *Attorney, Agent, or Firm* — Winston Hsu; Scott Margo

(57) ABSTRACT

A force feedback mechanism disposed inside a casing for vibration balance of the casing is disclosed in the present invention. The force feedback mechanism includes an accelerator, a force generator and a controller. The accelerator detects an acceleration parameter of the casing. The force generator respectively generates an effective force at a first direction and a second direction. The first direction is substantially opposite to the second direction. The controller is electrically connected to the accelerator and the force generator. The controller obtains and analyzes absolute value and vector of the acceleration parameter, and drives the force generator to generate the corresponding effective force according to the absolute value and the vector.

19 Claims, 5 Drawing Sheets

(56) References Cited

U.S. PATENT DOCUMENTS

| | | | |
|---|---|---|---|
| 2009/0180253 A1* | 7/2009 | Chang et al. | 361/695 |
| 2009/0181727 A1* | 7/2009 | Fagrenius | B06B 1/16 455/567 |
| 2011/0002096 A1* | 1/2011 | Thorson | G06F 1/1618 361/679.04 |

* cited by examiner

FORCE FEEDBACK MECHANISM AND RELATED ELECTRONIC DEVICE AND OPERATION METHOD

BACKGROUND OF THE INVENTION

1. Field of the Invention

The present invention relates to a force feedback mechanism, and more particularly, to a force feedback mechanism and a related electronic device and an operation method of balancing vibration of a casing.

2. Description of the Prior Art

With the advanced technology, the computer system utilizes the touch screen to simultaneously provide displaying function and touch inputting function. A surface of the touch screen can be contacted to conveniently input the control command. The touch screen is widespread applied to the notebook computer and the all-in-one (AOI) computer. However, when the user inputs the control command via the touch screen, external force applied to the touch screen makes vibration of the notebook computer or the AOI computer. For example, the screen of the notebook computer is vibrated relative to the host, the screen of the AOI computer is vibrated relative to the base. Wide vibration of the touch screen results in uncomfortable operation. Thus, design of a balance mechanism and a related operation method capable of effectively balancing the vibration of the touch screen is an important issue in the computer industry.

SUMMARY OF THE INVENTION

The present invention provides a force feedback mechanism and a related electronic device and an operation method of balancing vibration of a casing for solving above drawbacks.

According to the claimed invention, a force feedback mechanism disposed inside a casing for balancing vibration of the casing is disclosed. The force feedback mechanism includes an accelerator, a force generator and a controller. The accelerator detects an acceleration parameter of the casing. The force generator generates an effective force at a first direction or a second direction, and the first direction is substantially opposite to the second direction. The controller is electrically connected to the accelerator and the force generator. The controller obtains and analyzes absolute value and vector of the acceleration parameter, and drives the force generator to generate the corresponding effective force according to the absolute value and the vector.

According to the claimed invention, the controller compares a threshold with the absolute value of the acceleration parameter, so as to actuate the force generator to generate the effective force when the absolute value is greater than the threshold, and to shut down the force generator when the absolute value is smaller than the threshold.

According to the claimed invention, the controller drives the force generator to generate the effective force at the second direction when the vector of the acceleration parameter is identical with the first direction. The controller further drives the force generator to generate the effective force at the first direction when the vector of the acceleration parameter is identical with the second direction.

According to the claimed invention, the force generator includes an electromagnetic component, a magnetic component and a counterweight component. The magnetic component is movably disposed on the electromagnetic component. The counterweight component is connected to the magnetic component. The controller drives the electromagnetic component to generate magnetic field variation, so as to move the magnetic component relative to the electromagnetic component, and the effective force is generated by simple harmonic motion of the counterweight component.

According to the claimed invention, the force generator includes a rotary component and a counterweight component. The rotary component includes a shaft, and the counterweight component is eccentrically disposed on the shaft. The effective force is generated by the counterweight component due to rotation of the shaft.

According to the claimed invention, the force generator includes an oscillatory component and a counterweight component. The counterweight component is connected to a bridging bar of the oscillatory component, and the effective force is generated by the counterweight component due to reciprocation of the bridging bar.

According to the claimed invention, the force generator further includes at least two shock-proof components respectively disposed on opposite sides of the counterweight component.

According to the claimed invention, the force feedback mechanism further includes a timer electrically connected to the controller. The controller utilizes the timer to count a predetermined period and driving the force generator to generate the effective force according to the predetermined period.

According to the claimed invention, the controller determines whether the force generator is driven to generate the effective force in each predetermined period, or the controller drives the force generator to generate the effective force with a period identical with a vibration period of the casing.

According to the claimed invention, an electronic device includes a first casing, a second casing and a force feedback mechanism. An edge of the second casing is movably disposed on the first casing. The force feedback mechanism is disposed on the other edge of the second casing opposite to the first casing. The force feedback mechanism includes an accelerator, a force generator and a controller. The accelerator detects an acceleration parameter of the casing. The force generator generates an effective force at a first direction or a second direction, and the first direction is substantially opposite to the second direction. The controller is electrically connected to the accelerator and the force generator. The controller obtains and analyzes absolute value and vector of the acceleration parameter, and drives the force generator to generate the corresponding effective force according to the absolute value and the vector.

According to the claimed invention, an operation method of utilizing a force feedback mechanism to balance vibration of a casing is disclosed. The operation method includes detecting an acceleration parameter, obtaining absolute value of the acceleration parameter, comparing a threshold with the absolute value, and generating an effective force to balance the vibration of the casing when the absolute value is greater than the threshold.

According to the claimed invention, the operation method does not generate the effective force when the absolute value is smaller than the threshold.

According to the claimed invention, the operation method further includes obtaining vector of the acceleration parameter, and generating the effective force at a direction opposite to the vector.

According to the claimed invention, the operation method of generating the effective force further includes detecting the acceleration parameter in each predetermined period, and determining whether the effective force is generated according to the latest acceleration parameter.

According to the claimed invention, the operation method of generating the effective force further includes obtaining a vibration period of the casing, and generating the effective force with a period identical with the vibration period of the casing.

According to the claimed invention, a maximum magnitude of the effective force is substantially identical with the threshold.

The present invention disposes the force feedback mechanism inside the casing of the electronic device. The force feedback mechanism can detect the acceleration parameter generated by the vibrated casing, and immediately obtain the absolute value and the vector of the acceleration parameter, so as to determine whether the force generator is driven to generate the effective force at the specific direction. The force feedback mechanism generates the effective force at the second direction when the casing is vibrated at the first direction, and the force feedback mechanism generates the effective force at the first direction when the casing is vibrated at the second direction. The force feedback mechanism generates reaction force relative to the vibration direction of the casing, so as to balance the amplitude of the vibration to steady the casing. Furthermore, the force feedback mechanism can utilize the electromagnetically drive, the rotary eccentric mass or the reciprocal oscillation to generate the inertia force or the impact force for the vibration balance. Comparing to the prior art, the force feedback mechanism and the related electronic device and the related operation method of the present invention can actively generate the effective force by the detected acceleration and utilize force equilibrium to balance the vibration of the casing, so as to provide a comfortable operative environment of the touch screen and the electronic device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
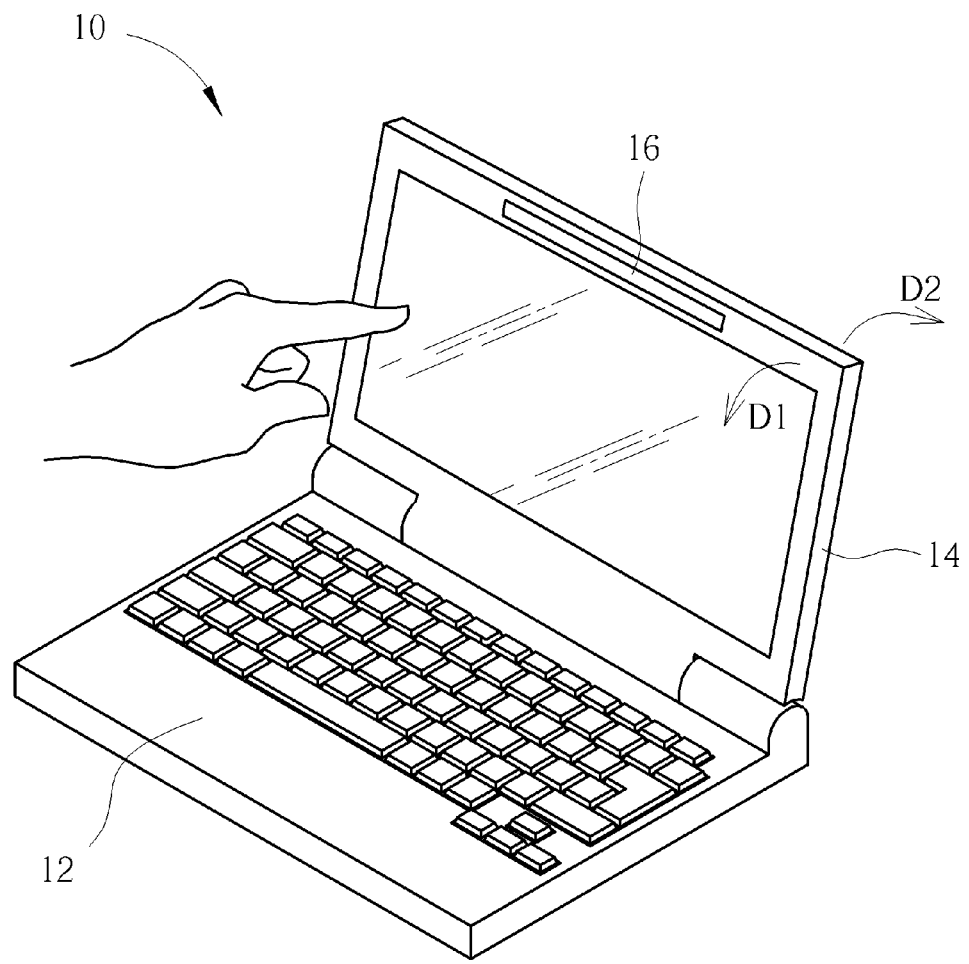
FIG. 1 is a diagram of the electronic device according to an embodiment of the present invention.

Please refer to FIG. 1. FIG. 1 is a diagram of an electronic device 10 according to an embodiment of the present invention. The electronic device 10 can be the notebook computer and the all-in-one (AOI) computer. The electronic device 10 includes a first casing 12, a second casing 14 and a force feedback mechanism 16. The first casing 12 can be the base or the host of the electronic device 10. The second casing 14 can be the displaying screen of the electronic device 10, and the second casing 14 preferably includes a touch screen. An edge of the second casing 14 is movably disposed on the first casing 12. For example, the second casing 14 can be disposed on the first casing 12 in a rotatable manner or an unstable manner. The force feedback mechanism 16 is disposed on the other edge of the second casing 14 opposite to the first casing 12. The second casing 14 is vibrated relative to the first casing 12 when the screen of the second casing 14 is utilized to input a touch command, the force feedback mechanism 15 can detect vibration of the second casing 14 and actuate a force feedback function, so as to balance the vibration of the second casing 14.

Figure 2:
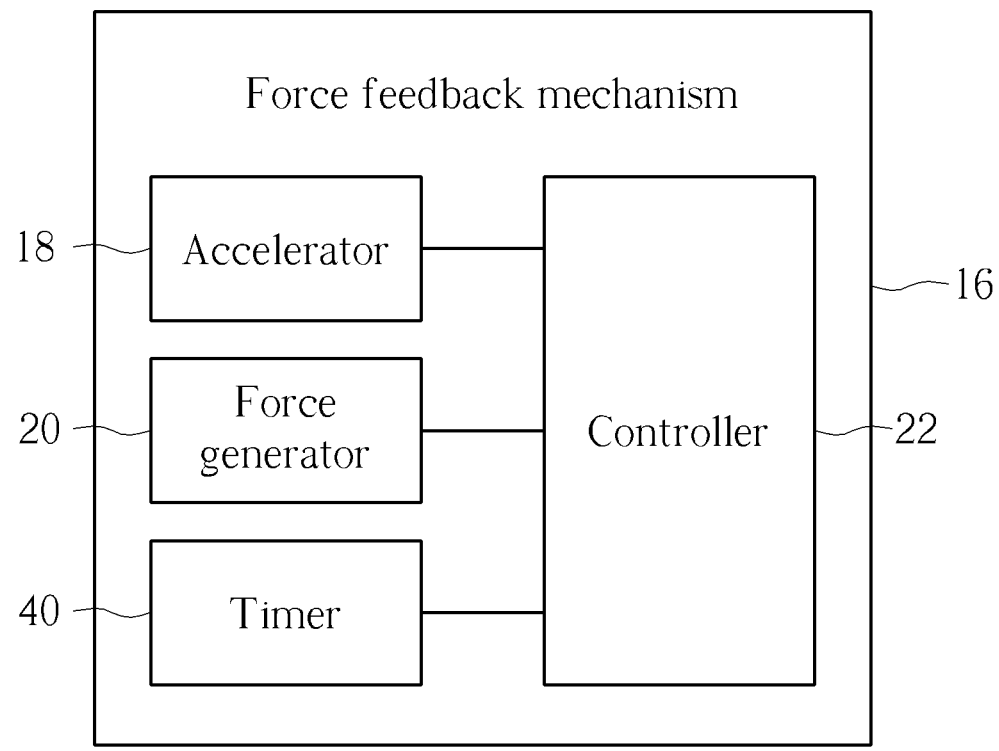
FIG. 2 is a functional block diagram of the force feedback mechanism according to the embodiment of the present invention.

Please refer to FIG. 2. FIG. 2 is a functional block diagram of the force feedback mechanism 16 according to the embodiment of the present invention. The force feedback mechanism 16 is disposed on a free edge of the second casing 14. The free edge of the second casing 14 is not connected to the first casing 12 and has maximum amplitude of the vibration. The force feedback mechanism 16 includes an accelerator 18, a force generator 20 and a controller 22. The accelerator 18 can detect an acceleration parameter, such as an acceleration of the free edge of the second casing 14. Absolute value of the acceleration parameter corresponds to vibration amplitude of the second casing 14 relative to the first casing 12. The amplitude of the vibration is greater, the absolute value becomes greater; the amplitude of the vibration is smaller, the absolute value becomes smaller accordingly. Vector of the acceleration parameter corresponds to vibration direction of the second casing 14 relative to the first casing 12. The vector is positive when the second casing 14 rotates at a clockwise direction, and the vector is negative when the second casing 14 rotates at a counterclockwise direction.

As shown in FIG. 1 and FIG. 2, the force generator 20 can utilize inertia force or impact force to generate the effective force to balance the vibration. Generally, the effective force can be generated at the first direction D1 and the second direction D2 opposite to each other. The second casing 14 moves relative to the first casing 12 back and forth respectively at the first direction D1 and the second direction D2, and the force generator 20 can accordingly generate the effective force opposite to the vibration direction of the casing, so as to decrease the vibration amplitude of the casing. Besides, the controller 22 is electrically connected to the accelerator 18 and the force generator 20. The controller 22 can be an exclusive processor of the force feedback mechanism 16, or can be the central processing unit of the electronic device 10. The controller 22 utilizes the accelerator 18 to obtain and analyze the absolute value and the vector of the acceleration parameter, and drives the force generator 20 to generator the effective force with corresponding magnitude and direction according to analysis result. The effective force can balance the vibration of the second casing 14 relative to the first casing 12 to steady the second casing 14.

Figure 3:
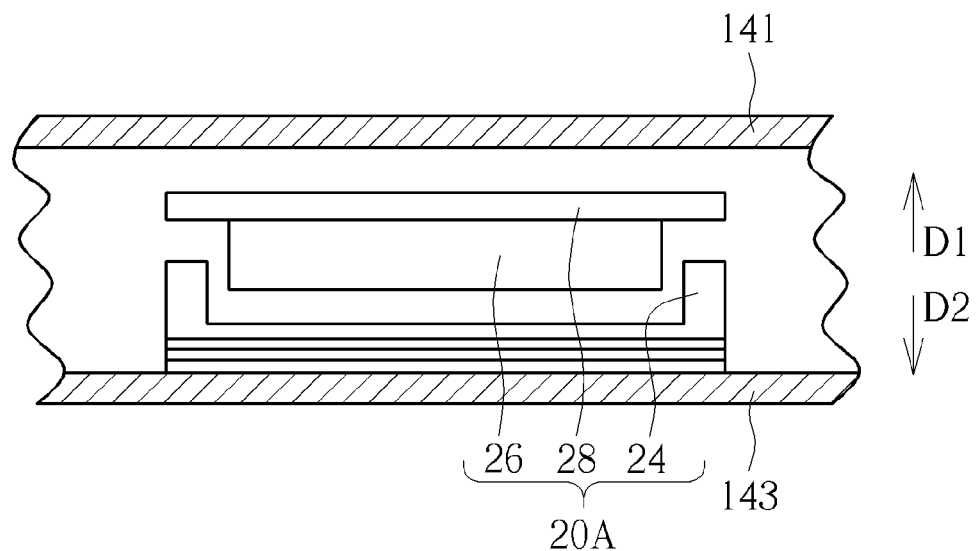
FIG. 3 is a diagram of the force generator according to the first embodiment of the present invention.

Please refer to FIG. 3. FIG. 3 is a diagram of the force generator 20A according to a first embodiment of the present invention. The force generator 20A is disposed between portions 141 and 143 of the second casing 14. The portions 141 and 143 respectively are the front cover and the rear cover of the second casing 14. The force feedback generator 20A includes an electromagnetic component 24, a magnetic component 26 and a counterweight component 28. The magnetic component 26 is movably disposed on the electromagnetic component 24, and the counterweight component 28 is connected to the magnetic component 26. The controller 22 can adjust a magnetic field of the electromagnetic component 24 to move the magnetic component 26 relative to the electromagnetic component 24. The controller 22 utilizes the electromagnetic component 24 to control reciprocation of the counterweight component 28, so as to generate simple harmonic motion or the impact force applied to the portions 141 and 143. The simple harmonic motion represents that the counterweight component 28 is vibrated inside the second casing 14 without contact of the portions 141 and 143. The impact force represents that the counterweight component 28 moves up and down to hit the portions 141 and 143 via the electromagnetic component 24. It is to say, the force generator 20A can generate the inertia force or the impact force (the effective force) sequentially at the first direction D1 and the second direction D2 to balance the vibration of the second casing 14 by an electromagnetically drive method. Magnitude of the effective force corresponds to acceleration of the counterweight component 28.

Figure 4:
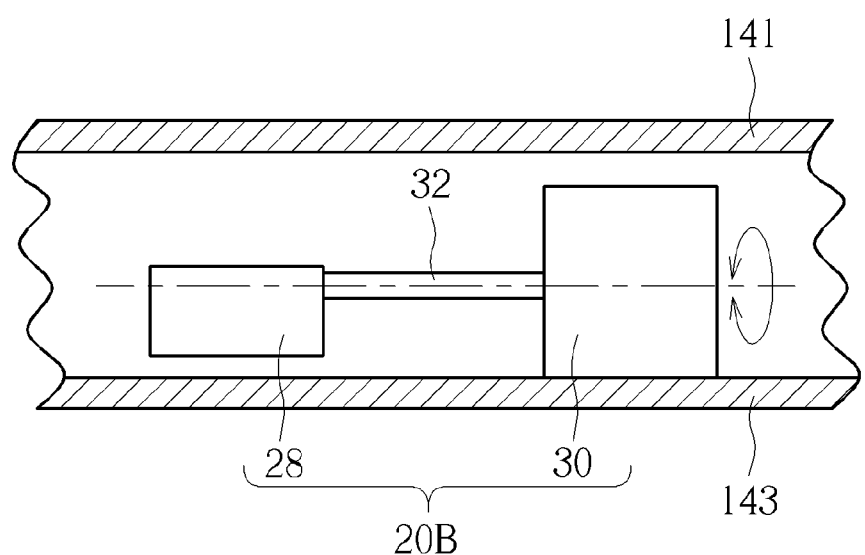
FIG. 4 is a diagram of the force generator according to the second embodiment of the present invention.

Please refer to FIG. 4. FIG. 4 is a diagram of the force generator 20B according to a second embodiment of the present invention. The force generator 20B is disposed between the portions 141 and 143 of the second casing 14. The force generator 20B includes the counterweight component 28 and a rotary component 30. The counterweight component 28 can be eccentrically disposed on a shaft 32 of the rotary component 30, which means the counterweight component 28 is an eccentric mass disposed on the rotary component 30. The rotary component 30 can be an electric motor. When the rotary component 30 is actuated, the shaft is revolved on its own axis to rotate the counterweight component 28 at an arrow direction shown in FIG. 4, and the inertia force or the impact force (the effective force) is accordingly generated to balance the vibration. For example, the counterweight component 28 has small size, rotation of the counterweight component 28 is not interfered with the portions 141 and 143, and the inertia force is generated to balance the vibration of the second casing 14. The counterweight component 28 has large size, the rotation of the counterweight component 28 may hit the portions 141 and 143, and the impact force is applied to balance the vibration. Furthermore, the controller 22 utilizes the clockwise rotation and the counterclockwise rotation of the counterweight component 28 to control direction of the effective force, and further adjusts angular acceleration of the rotation to control magnitude of the effective force.

Figure 5:
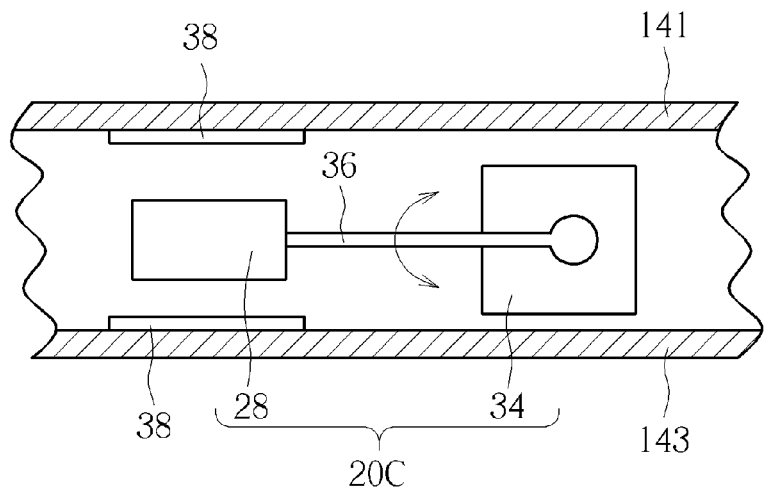
FIG. 5 is a diagram of the force generator according to the third embodiment of the present invention.

Please refer to FIG. 5. FIG. 5 is a diagram of the force generator 20C according to a third embodiment of the present invention. The force generator 20C is disposed between the portions 141 and 143 of the second casing 14. The force generator 20C includes the counterweight component 28 and an oscillatory component 34. The counterweight component 28 is connected to a bridging bar 36 of the oscillatory component 34. The oscillatory component 34 can be viewed as an electrical machine, which drives the bridging bar 36 to oscillate within a predetermined range at an arrow direction shown in FIG. 5. The counterweight component 28 can sequentially hit the portions 141 and 143 according to oscillation of the bridging bar 36, so as to generate the effective force (the impact force) to balance the vibration of the casing. In the above-mentioned embodiments of the present invention, elements having the same numeral have the same structure and function, such as the counterweight component 28 and the portions 141 and 143, and the detailed description is omitted herein for simplicity.

As the force generator 20 generates the impact effective force, the force generator 20 further can include at least two shock-proof components 38 respectively disposed on opposite sides of the counterweight component 28 for absorbing the impact force. The first embodiment, the second embodiment and the third embodiment can include the shock-proof component 38. The force generator 20 that utilizes the impact force (the effective force) to balance the vibration preferably includes the shock-proof component 38 to prevent direct contact between the counterweight component 28 and the portions 141 and 143. In the third embodiment, as shown in FIG. 5, the shock-proof component 38 can be selectively disposed on the counterweight component 28 or the portions 141 and 143. The shock-proof component 38 disposed between the counterweight component 28 and the portions 141 and 143 for prevention of the direct contact belongs to the scope of the present invention. The shock-proof component 38 can be the resilient unit, the rubber unit, the sponge unit, or the unit made by any material with a resilient recover property to absorb the vibration. Dimensions, length and width of the shock-proof component 38 are not limited to ones shown in FIG. 5, and depend on design demand.

It should be mentioned that the second casing 14 has the specific natural oscillation period according to its dimensions and weight, which means the electronic device 10 in different types includes the second casing 14 with different vibration period. The controller 22 can include the built-in database, the register or the storage component, and the vibration period of the second casing 14 is stored in the controller 22 of the force feedback mechanism 16. The controller 22 can drive the force generator 20 to generate the effective force with a period identical with the vibration period of the second casing 14. Half-cycle phase difference is set between the effective force and the natural oscillation of the second casing 14, so that the effective force can balance the amplitude of the natural oscillation of the second casing 14. Further, as shown in FIG. 2, the force feedback mechanism 16 can selectively include a timer 40 electrically connected to the controller 22. The controller 22 utilizes the timer 40 to count a predetermined period, and determines whether the force generator 20 is driven to generate the effective force in each predetermined period, to accordingly balance the natural oscillation of the second casing 14.

Figure 6:
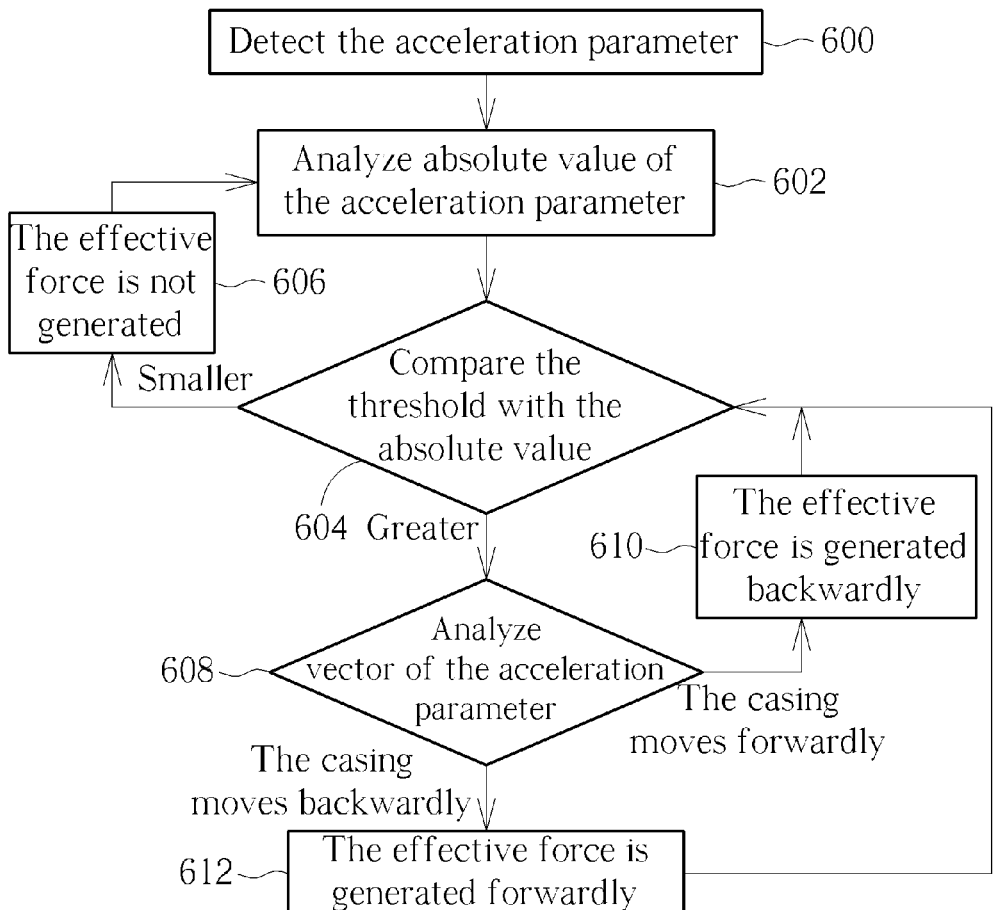
FIG. 6 is a flow chart of utilizing the force feedback mechanism to balance the vibration of the casing according to the embodiment of the present invention.

Please refer to FIG. 6. FIG. 6 is a flow chart of utilizing the force feedback mechanism 16 to balance the vibration of the casing according to the embodiment of the present invention. The operation method illustrated in FIG. 6 is suitable for the force feedback mechanism 16 shown in FIG. 1 and FIG. 2. First, step 600 and step 602 are executed that the accelerator 18 detects the acceleration parameter, and the controller 22 analyzes the acceleration parameter to obtain the absolute value and the vector. Step 604 is executed that the controller 22 reads the built-in threshold to compare the threshold with the absolute value of the acceleration parameter. The threshold can be pre-stored in the controller 22, the same as the natural oscillation of the second casing 14. When the absolute value is smaller than the threshold, the vibration of the second casing 14 is under tolerance, step 606 is executed to idle the force generator 20, which is shut down by the controller 22, and step 602 is executed to continuously detect variation of the acceleration parameter.

When the absolute parameter is greater than the threshold, the natural oscillation of the second casing 14 has large amplitude, step 608 is executed that the controller 22 determines the vector of the acceleration parameter. The vector of the acceleration parameter represents the vibration direction of the second casing 14. The controller 22 obtains the vibration direction of the second casing 14 and then drives the force generator 20 to generate the opposite effective force. As shown in FIG. 1, when the second casing 14 is vibrated forwardly (at the first direction D1), step 610 is executed that the controller 22 drives the force generator 20 to generate the effective force at the second direction D2. When the second casing 14 is vibrated backwardly (at the second direction D2), step 612 is executed that the controller 22 drives the force generator 20 to generate the effective force at the first direction D1. The electronic device 10 can utilize reverse motion of the effective force to balance the natural oscillation of the second casing 14. After the effective force is applied to affect the casing, step 604 is executed that the controller 22 compares the threshold with the absolute value of the acceleration parameter. The effective force is continuously generated when the absolute value is greater than the threshold. The force generator 20 is shut down when the absolute value is smaller than the threshold, to ensure that the magnitude of the effective force is under control to prevent adverse reaction.

Figure 7:
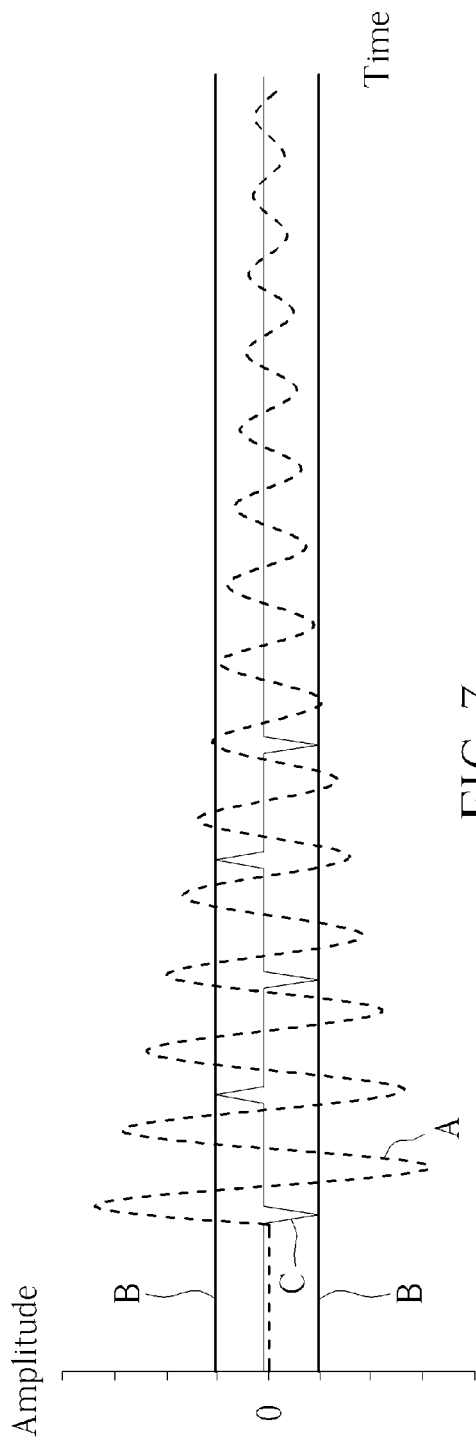
FIG. 7 is a comparison diagram of the natural oscillation of the second casing and the effective force generated by the force generator according to the embodiment of the present invention.

Please refer to FIG. 7. FIG. 7 is a comparison diagram of the natural oscillation of the second casing 14 and the effective force generated by the force generator 20 according to the embodiment of the present invention. The natural oscillation of the second casing 14 is wave A, which has invariable vibration period. The amplitude of the wave A is decayed gradually, and the vibration of the second casing 14 slows down accordingly. The threshold B is set by the user. The amplitude of the wave A from the first period to the sixth period are greater than the threshold B, the vibration of the second casing 14 is over the tolerance, and the force feedback mechanism 16 is actuated to balance the vibration. The effective force generated by the force generator 20 is wave C. In this embodiment, the controller 22 can detect the acceleration parameter in each predetermined period according to information from the timer 40, so as to determine whether the force generator 20 is driven to generate the effective force according to the latest acceleration parameter. The related method is illustrated by steps 604-612 shown in FIG. 6. For example, the controller 22 can drive the force generator 20 to generate the effective force from the first period to the sixth period to balance the vibration of the second casing 14, and the amplitude of the vibration is constrained under the threshold B. Therefore, in the seventh period, the force generator 20 is shut down because the vibration amplitude of the second casing 14 is smaller than the threshold B.

Figure 8:
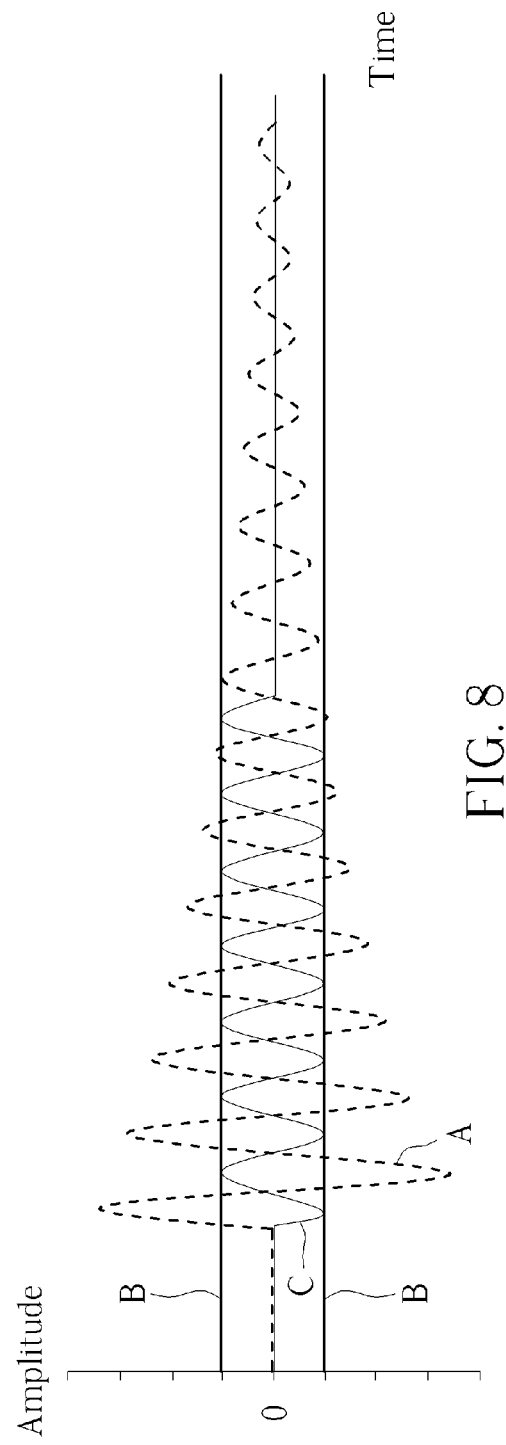
FIG. 8 is a comparison diagram of the natural oscillation of the second casing and the effective force generated by the force generator according to the other embodiment of the present invention.

Please refer to FIG. 8. FIG. 8 is a comparison diagram of the natural oscillation of the second casing 14 and the effective force generated by the force generator 20 according to the other embodiment of the present invention. The natural oscillation of the second casing 14 is wave A, the threshold B is set accordingly, and the effective force generated by the force generator 20 is wave C. Period of the wave C can be substantially identical with the natural oscillation period of the second casing 14. In this embodiment, the controller 22 drives the force generator 20 to generate the effective force C when the absolute value of the acceleration parameter is greater than the threshold B. The half-cycle phase difference is set between the effective force C and the natural oscillation A, so that the effective force C can offset the amplitude of the natural oscillation A to balance the vibration of the casing. As shown in FIG. 7 and FIG. 8, the magnitude of the effective force is preferably identical with the threshold B. Operation of the electronic device 10 is uncomfortable when the amplitude of the natural oscillation A is greater than the threshold B. The effective force C is designed to be at least equal to or smaller than the threshold B, to prevent the casing from being vibrated by the effective force.

In conclusion, the present invention disposes the force feedback mechanism inside the casing of the electronic device. The force feedback mechanism can detect the acceleration parameter generated by the vibrated casing, and immediately obtain the absolute value and the vector of the acceleration parameter, so as to determine whether the force generator is driven to generate the effective force at the specific direction. The force feedback mechanism generates the effective force at the second direction when the casing is vibrated at the first direction, and the force feedback mechanism generates the effective force at the first direction when the casing is vibrated at the second direction. The force feedback mechanism generates reaction force relative to the vibration direction of the casing, so as to balance the amplitude of the vibration to steady the casing. In addition, the force feedback mechanism utilizes the electromagnetically drive, the rotary eccentric mass or the reciprocal oscillation to generate the inertia force or the impact force for the vibration balance. Comparing to the prior art, the force feedback mechanism and the related electronic device and the related operation method of the present invention can actively generate the effective force by the detected acceleration and utilize force equilibrium to balance the vibration of the casing, so as to provide a comfortable operative environment of the touch screen and the electronic device.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A force feedback mechanism disposed inside a casing for balancing vibration of the casing, the force feedback mechanism comprising:
   an accelerator for detecting an acceleration parameter of the casing;
   a force generator for generating an effective force at a first direction or a second direction, wherein the first direction is substantially opposite to the second direction;
   a controller electrically connected to the accelerator and the force generator, the controller obtaining and analyzing absolute value and vector of the acceleration parameter to acquire amplitude and period of natural oscillation of the casing, the controller further comparing a threshold with the absolute value of the acceleration parameter, and driving the force generator to generate a periodic oscillation corresponding to the amplitude and the period of the foresaid natural oscillation so as to exert the corresponding effective force upon the casing according to the absolute value and the vector when the absolute value is greater than the threshold or to shut down the force generator when the absolute value is smaller than the threshold, the controller further determining whether the force generator is driven to generate the effective force in a predetermined period or driving the force generator to generate the effective force with a pre-stored period identical with a vibration period of the casing,
   wherein the effective force represents a counterweight component moving a predetermined distance to balance the vibration of the casing, and
   wherein a magnitude of the effective force corresponds to an acceleration of the counterweight component.

2. The force feedback mechanism of claim 1, wherein the controller drives the force generator to generate the effective force at the second direction when the vector of the acceleration parameter is identical with the first direction, the controller further drives the force generator to generate the effective force at the first direction when the vector of the acceleration parameter is identical with the second direction.

3. The force feedback mechanism of claim 1, wherein the force generator comprises an electromagnetic component, a magnetic component and the counterweight component, the magnetic component is movably disposed on the electromagnetic component, the counterweight component is connected to the magnetic component, the controller drives the electromagnetic component to generate magnetic field variation, so as to move the magnetic component relative to the electromagnetic component, and the effective force is generated by simple harmonic motion of the counterweight component.

4. The force feedback mechanism of claim 1, wherein the force generator comprises a rotary component and the counterweight component, the rotary component comprises a shaft, the counterweight component is eccentrically disposed on the shaft, and the effective force is generated by the counterweight component due to rotation of the shaft.

5. The force feedback mechanism of claim 1, wherein the force generator comprises an oscillatory component and the counterweight component, the counterweight component is connected to a bridging bar of the oscillatory component, and the effective force is generated by the counterweight component due to reciprocation of the bridging bar.

6. The force feedback mechanism of claim 1, further comprising:
a timer electrically connected to the controller, the controller utilizing the timer to count the predetermined period and driving the force generator to generate the effective force according to the predetermined period.

7. An electronic device comprising:
a first casing;
a second casing, an edge of the second casing being movably disposed on the first casing; and
a force feedback mechanism disposed on the other edge of the second casing opposite to the first casing, the force feedback mechanism comprising:
an accelerator for detecting an acceleration parameter, the acceleration parameter corresponding to direction and amplitude of vibration of the second casing relative to the first casing;
a force generator for generating an effective force at a first direction or a second direction, wherein the first direction is substantially opposite to the second direction;
a controller electrically connected to the accelerator and the force generator, the controller obtaining and analyzing absolute value and vector of the acceleration parameter to acquire amplitude and period of natural oscillation of the second casing, the controller further comparing a threshold with the absolute value of the acceleration parameter, and driving the force generator to generate a periodic oscillation corresponding to the amplitude and the period of the foresaid natural oscillation so as to exert the corresponding effective force upon the second casing according to the absolute value and the vector when the absolute value is greater than the threshold or to shut down the force generator when the absolute value is smaller than the threshold, so as to balance the vibration of the second casing relative to the first casing, the controller further determining whether the force generator is driven to generate the effective force in a predetermined period or driving the force generator to generate the effective force with a pre-stored period identical with a vibration period of the casing, wherein the effective force represents a counterweight component moving a predetermined distance to balance the vibration of the second casing, wherein a magnitude of the effective force corresponds to an acceleration of the counterweight component.

8. The electronic device of claim 7, wherein the second casing rotates relative to the first casing at the first direction, the vector of the acceleration parameter is substantially identical with the first direction, and the controller drives the force generator to generate the effective force at the second direction.

9. The electronic device of claim 7, wherein the force generator comprises an electromagnetic component, a magnetic component and the counterweight component, the magnetic component is movably disposed on the electromagnetic component, the counterweight component is connected to the magnetic component, the controller drives the electromagnetic component to generate magnetic field variation, so as to move the magnetic component relative to the electromagnetic component, and the effective force is generated by simple harmonic motion of the counterweight component.

10. The electronic device of claim 7, wherein the force generator comprises a rotary component and the counterweight component, the rotary component comprises a shaft, the counterweight component is eccentrically disposed on the shaft, and the effective force is generated by the counterweight component due to rotation of the shaft.

11. The electronic device of claim 7, wherein the force generator comprises an oscillatory component and the counterweight component, the counterweight component is connected to a bridging bar of the oscillatory component, and the effective force is generated by the counterweight component due to reciprocation of the bridging bar.

12. The electronic device of claim 7, wherein the force feedback mechanism further comprises:
a timer electrically connected to the controller, the controller utilizing the timer to count the predetermined period and driving the force generator to generate the effective force according to the predetermined period.

13. An operation method of utilizing a force feedback mechanism to balance vibration of a casing, the operation method comprising:
detecting an acceleration parameter;
obtaining absolute value of the acceleration parameter and acquiring amplitude and period of natural oscillation of the casing;
comparing a threshold with the absolute value; and
generating a periodic oscillation corresponding to the amplitude and the period of the natural oscillation by the force feedback mechanism so as to exert an effective force upon the casing to balance the vibration of the casing when the absolute value is greater than the threshold or not to exert the effective force when the absolute value is smaller than the threshold, wherein the effective force is generated in a predetermined period or is generated by a pre-stored period identical with a vibration period of the casing,
wherein the effective force represents a counterweight component moving a predetermined distance to balance the vibration of the casing, wherein a magnitude of the effective force corresponds to an acceleration of the counterweight component.

14. The operation method of claim 13, further comprising:
obtaining vector of the acceleration parameter; and
generating the effective force at a direction opposite to the vector.

15. The operation method of claim 13, wherein the operation method of generating the effective force further comprises:
- detecting the acceleration parameter in the each predetermined period; and
- determining whether the effective force is generated according to the latest acceleration parameter.

16. The operation method of claim 13, wherein the operation method of generating the effective force further comprises:
- obtaining the vibration period of the casing; and
- generating the effective force with a period identical with the vibration period of the casing.

17. The force feedback mechanism of claim 5, further comprising:
- at least two shock-proof components respectively disposed by opposite sides of the counterweight component.

18. The electronic device of claim 11, wherein the force generator further comprises at least two shock-proof components respectively disposed by opposite sides of the counterweight component.

19. The operation method of claim 13, wherein a maximal magnitude of the effective force is substantially identical with the threshold.

\* \* \* \* \*